(12) United States Patent
Seino

(10) Patent No.: US 12,405,427 B2
(45) Date of Patent: Sep. 2, 2025

(54) OPTICAL CONNECTOR HAVING FITTED HOUSINGS APPLYING PRESSURE TO A PROTECTION SLEEVE

(71) Applicant: Fujikura Ltd., Tokyo (JP)

(72) Inventor: Ririka Seino, Sakura (JP)

(73) Assignee: Fujikura Ltd., Tokyo (JP)

( * ) Notice: Subject to any disclaimer, the term of this patent is extended or adjusted under 35 U.S.C. 154(b) by 190 days.

(21) Appl. No.: 18/270,589

(22) PCT Filed: Nov. 24, 2021

(86) PCT No.: PCT/JP2021/042889
§ 371 (c)(1),
(2) Date: Jun. 30, 2023

(87) PCT Pub. No.: WO2022/190467
PCT Pub. Date: Sep. 15, 2022

(65) Prior Publication Data
US 2024/0061185 A1    Feb. 22, 2024

(30) Foreign Application Priority Data
Mar. 11, 2021  (JP) ................................ 2021-039283

(51) Int. Cl.
G02B 6/38    (2006.01)
(52) U.S. Cl.
CPC .........  G02B 6/3825 (2013.01); G02B 6/3849 (2013.01); G02B 6/3893 (2013.01)
(58) Field of Classification Search
CPC .. G02B 6/3825; G02B 6/3849; G02B 6/3893; G02B 6/3888; G02B 6/387; G02B 6/3821; G02B 6/3874
See application file for complete search history.

(56) References Cited

U.S. PATENT DOCUMENTS 6,081,647 A * 6/2000 Roth .................... G02B 6/3885
                                                             385/139
6,154,597 A * 11/2000 Roth .................... G02B 6/3885
                                                             385/139

(Continued)

FOREIGN PATENT DOCUMENTS

JP    H03119804 U    12/1991
JP    2011095410 A    5/2011

(Continued)

OTHER PUBLICATIONS

English translation of the International Search Report issued in corresponding International Application No. PCT/JP2021/042889, mailed Jan. 25, 2022 (2 pages).

*Primary Examiner* — Andrew Jordan
(74) *Attorney, Agent, or Firm* — Osha Bergman Watanabe & Burton LLP

(57) ABSTRACT

An optical connector includes: a ferrule holding an optical fiber; a holder holding the ferrule; a protection sleeve including a tip that is fixed to a sleeve fixing portion of the holder; an inner housing in which at least a part of the sleeve fixing portion is housed; and an outer housing in which at least a part of the inner housing is housed. The inner housing includes a tab portion that tilts in a radial direction of the ferrule and applies a pressure on the protection sleeve by tilting inward in the radial direction in a state in which the tab portion is disposed inside the outer housing.

6 Claims, 7 Drawing Sheets

(56) References Cited

U.S. PATENT DOCUMENTS

| | | | | |
|---|---|---|---|---|
| 10,126,508 B2* | 11/2018 | Compton | ............ | G02B 6/4432 |
| 11,009,667 B2* | 5/2021 | Isenhour | ............ | G02B 6/3869 |
| 11,487,064 B2* | 11/2022 | Isenhour | ............ | G02B 6/3877 |
| 11,555,969 B2* | 1/2023 | Compton | ............ | G02B 6/3874 |
| 11,719,894 B2* | 8/2023 | Isenhour | ............ | G02B 6/4432 |
| | | | | 385/81 |
| 2018/0045894 A1* | 2/2018 | Takahashi | ............ | G02B 6/3877 |
| 2018/0329157 A1* | 11/2018 | Crawford | ............ | G02B 6/3874 |
| 2023/0314713 A1* | 10/2023 | Seino | ............ | G02B 6/3846 |
| | | | | 385/99 |
| 2024/0061185 A1* | 2/2024 | Seino | ............ | G02B 6/3888 |

FOREIGN PATENT DOCUMENTS

| | | |
|---|---|---|
| JP | 2014153511 A | 8/2014 |
| KR | 20110066306 A | 6/2011 |
| WO | 2019186657 A1 | 10/2019 |

\* cited by examiner

FIG. 6
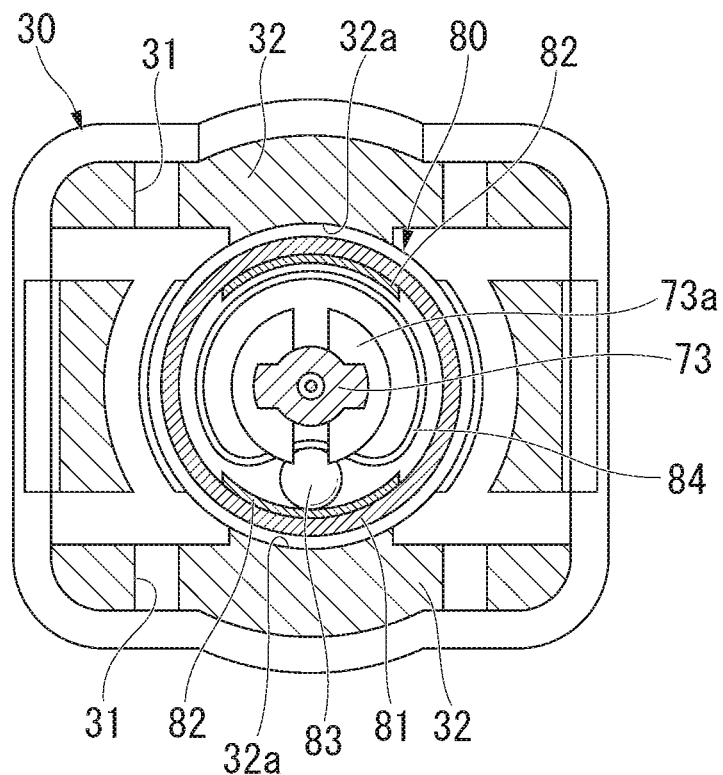
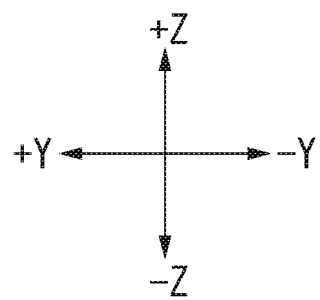

OPTICAL CONNECTOR HAVING FITTED HOUSINGS APPLYING PRESSURE TO A PROTECTION SLEEVE

CROSS-REFERENCE TO RELATED APPLICATIONS

This application claims priority to Japanese Patent Application No. 2021-039283, filed Mar. 11, 2021, the entire content of which is incorporated herein by reference.

TECHNICAL FIELD

The present invention relates to an optical connector.

BACKGROUND

Patent Document 1 discloses an optical connector having a configuration in which a built-in fiber held by a ferrule member is fusion-spliced to another optical fiber, and a fusion-spliced portion thereof is protected by a protection sleeve. The protection sleeve is fixed to a flange portion of the ferrule member by heat shrinkage.

PATENT LITERATURE

[Patent Document 1]
Japanese Unexamined Patent Application, First Publication No. 2011-95410

Tension may act on the protection sleeve. As in Patent Document 1, when the protection sleeve is fixed only by a shrinkage force due to heating, a fixed state thereof tends to be unstable. As a result, there is a likelihood that the protection sleeve will fall off from the ferrule member due to the tension.

SUMMARY

One or more embodiments of the present invention provide an optical connector in which a fixed state of a protection sleeve is made stable.

An optical connector according to one or more embodiments of the present invention includes a ferrule holding an optical fiber, a holding part holding the ferrule, a protection sleeve whose tip is fixed to a sleeve fixing portion of the holding part, an inner housing inside which at least a part of the sleeve fixing portion is housed, and an outer housing inside which at least a part of the inner housing is housed, in which the inner housing includes a tab portion which is able to be tilted in a radial direction, and the tab portion is configured to apply a pressure on the protection sleeve by being tilted inward in the radial direction in a state in which the tab portion is positioned inside the outer housing.

According to the embodiments described above, by positioning the tab portion inside the outer housing, it is possible to tilt the tab portion inward in the radial direction to apply a pressure on the protection sleeve. Due to the pressure, it is possible to fix the protection sleeve to the sleeve fixing portion. Therefore, it is possible to stabilize a fixed state, compared to a case in which the protection sleeve is fixed only by a structure whose fixed state is affected by heating such as, for example, a heat shrinkage force of the protection sleeve.

Here, the tab portion may be disposed at a position facing the sleeve fixing portion.

Also, the sleeve fixing portion may include a plurality of protrusions disposed at intervals in a longitudinal direction and protruding outward in the radial direction, and the tab portion may be disposed at a position facing at least a part of the plurality of protrusions.

Also, an inner circumferential surface of the tab portion may have an arcuate shape when viewed from a longitudinal direction.

Also, the tab portion may have a contact surface which comes in contact with the outer housing in a state in which a pressure is applied on the protection sleeve, and the contact surface may be inclined with respect to an inner surface of the outer housing.

Also, a tensile strength member may be disposed inside of the protection sleeve, and the tensile strength member may be positioned between the tab portion and the sleeve fixing portion.

According to the above-described embodiments of the present invention, it is possible to provide an optical connector in which a fixed state of the protection sleeve is made stable.

BRIEF DESCRIPTION OF THE DRAWINGS

FIG. 6 is a cross-sectional view taken along line VI-VI indicated by the arrow in FIG. 5.

DETAILED DESCRIPTION

Hereinafter, an optical connector of one or more embodiments will be described with reference to the drawings.

Figure 1:
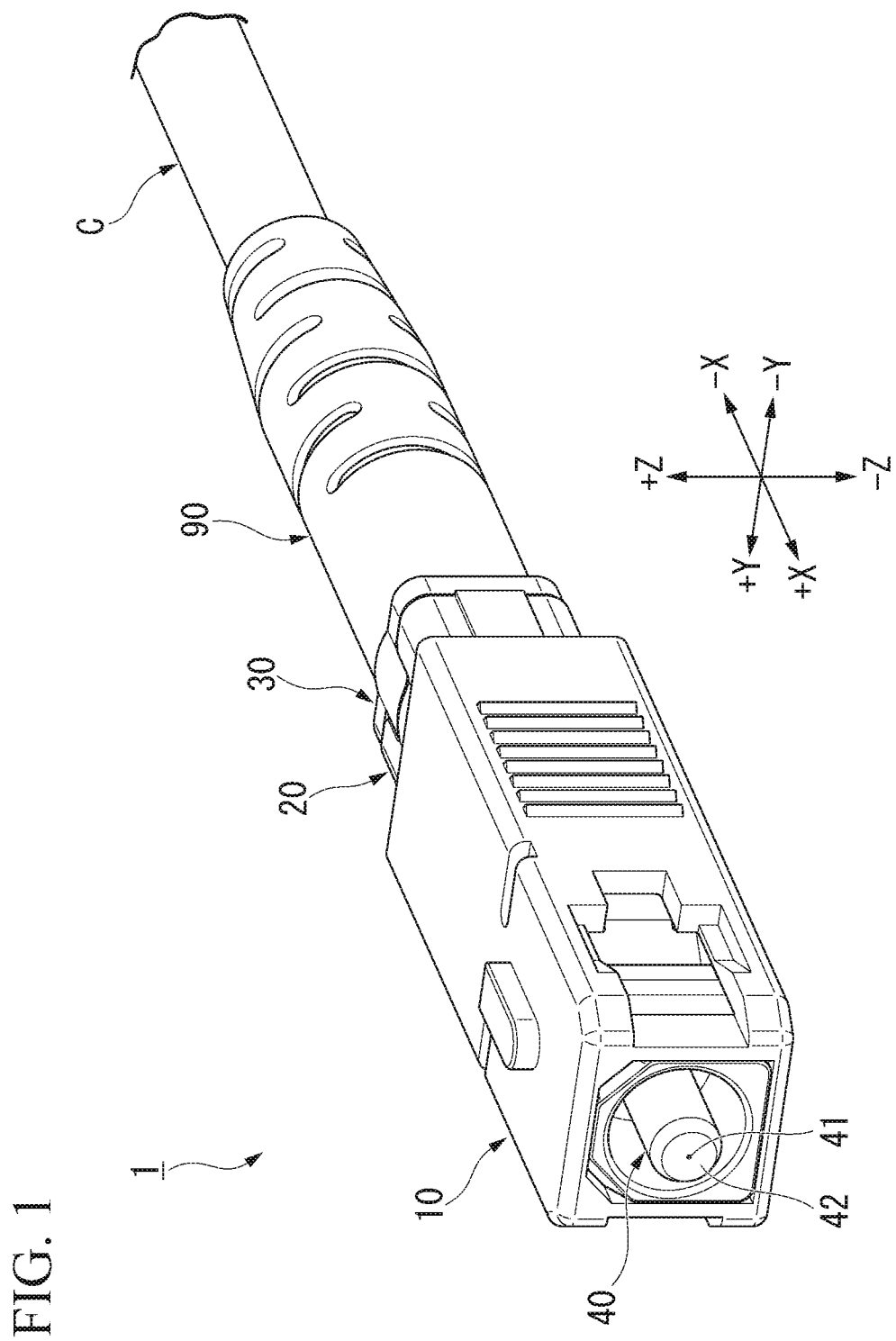
FIG. 1 is a perspective view of an optical connector according to one or more embodiments.
Figure 2:
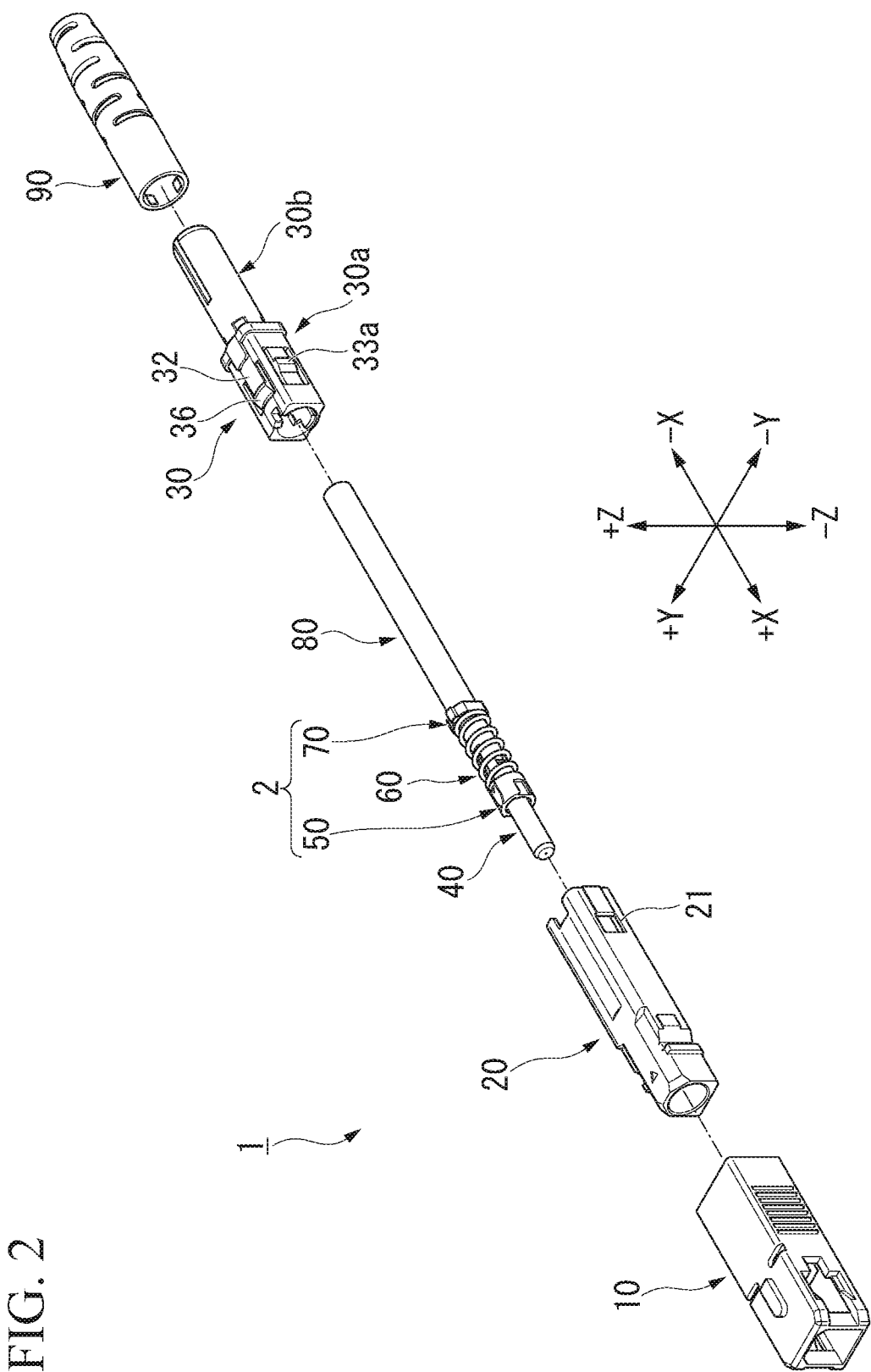
FIG. 2 is an exploded perspective view of the optical connector of FIG. 1.

As illustrated in FIGS. 1 and 2, an optical connector 1 includes a case 10, an outer housing 20, an inner housing 30, a ferrule 40, a holding part (i.e., holder) 2, a biasing member 60, a protection unit 80, and a boot 90. The optical connector 1 is provided at an end portion of an optical cable C. The ferrule 40 includes a fiber hole 41, and a connection end surface 42 at which the fiber hole 41 opens.

(Definition of Directions)

In one or more embodiments, a direction in which the fiber hole 41 extends is defined as a longitudinal direction X. One direction orthogonal to the longitudinal direction X is defined as a first direction Z, and a direction orthogonal to both the longitudinal direction X and the first direction Z is defined as a second direction Y. In the longitudinal direction X, the connection end surface 42 side of the ferrule 40 is defined as a front side (+X side) or a tip side. A side opposite to the front side is defined as a rear side (−X side) or a base end side. When viewed from the longitudinal direction X, a direction intersecting a central axis of the fiber hole 41 is defined as a radial direction, and a direction of revolving around the central axis is defined as a circumferential direction. The first direction Z may also be referred to as a vertical direction. One side in the first direction Z may be referred to as an upper side (+Z side). A side opposite to the upper side may be referred to as a lower side (−Z side). Also, one side in the second direction Y may be referred to as a left side (+Y side). A side opposite to the left side may be referred to as a right side (−Y side).

As illustrated in FIG. 1, the case 10 has a quadrangular tubular shape extending in the longitudinal direction X. The outer housing 20, the inner housing 30, the ferrule 40, and the like are disposed inside of the case 10 in the radial direction. The ferrule 40 protrudes forward from the case 10.

As illustrated in FIG. 2, the outer housing 20 has a quadrangular tubular shape extending in the longitudinal direction X. Note that, it is possible to change shapes of the case 10 and the outer housing 20 as appropriate and the shapes of the case 10 and the outer housing 20 may be, for example, cylindrical. A pair of locking holes 21 are formed on the outer housing 20. The pair of locking holes 21 are formed on a right surface (a surface facing the right side) and a left surface (a surface facing the left side) of the outer housing 20, respectively. That is, the pair of locking holes 21 are formed to be radially symmetrical with respect to the fiber hole 41.

Figure 3:
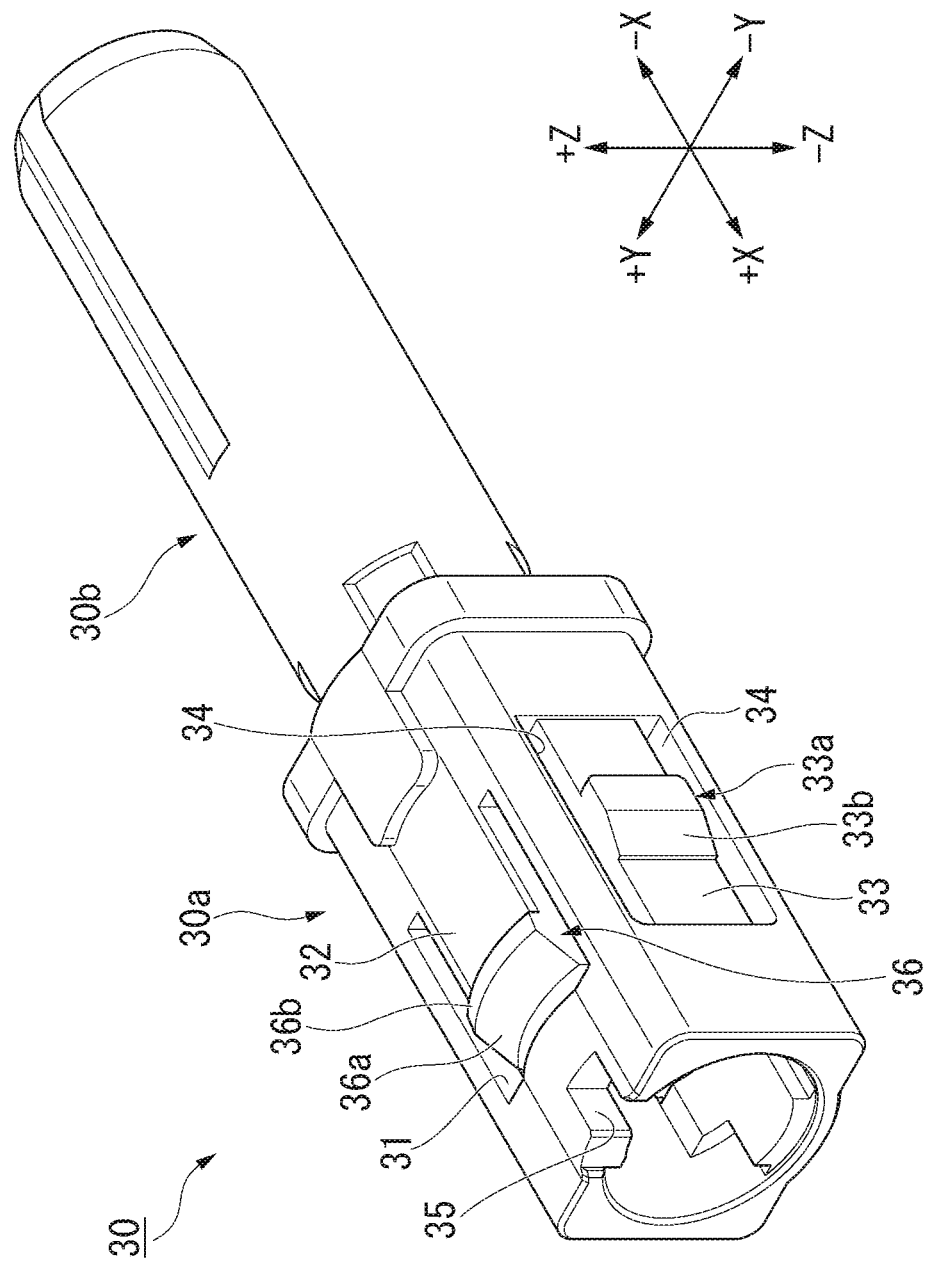
FIG. 3 is a perspective view of an inner housing of FIG. 2.

As illustrated in FIG. 3, the inner housing 30 includes a first tubular part 30a and a second tubular part 30b positioned behind the first tubular part 30a. The first tubular part 30a has a tubular shape extending in the longitudinal direction X and has a quadrangular cross section. The second tubular part 30b has a cylindrical shape extending in the longitudinal direction X. At least a part of the first tubular part 30a is housed inside the outer housing 20.

A slit 31 and a tab portion 32 are formed on each of an upper surface (a surface facing upward) and a lower surface (a surface facing downward) of the first tubular part 30a. That is, the inner housing 30 includes a pair of slits 31 and a pair of tab portions 32 symmetrically in the radial direction. The upper and lower slits 31 and tab portions 32 have shapes that are vertically symmetrical to each other. Each of the slits 31 has a C shape that opens toward the rear when viewed from the first direction Z. A portion of the inner housing 30 surrounded by the slit 31 is the tab portion 32. A base end portion (an end portion on the rear side) of the tab portion 32 is connected to the first tubular part 30a.

The tab portion 32 is a portion that is elastically deformable with respect to the first tubular part 30a. The tab portion 32 is configured to be elastically deformable in the first direction Z with the base end portion (base end side) as a base point when a tip side of the tab portion 32 receives an external force. That is, in a case of one or more embodiments, the tab portion 32 positioned on the upper side is able to be tilted downward, and the tab portion 32 positioned on the lower side is able to be tilted upward. A protruding portion 36 that protrudes outward in the first direction Z is formed at a tip portion (an end portion on the front side) of the tab portion 32. The protruding portion 36 has an inclined surface 36a (first inclined surface) and a contact surface 36b.

The inclined surface 36a is provided to facilitate insertion of the inner housing 30 into the outer housing 20 from behind. The inclined surface 36a is inclined outward in the first direction Z toward the rear. The contact surface 36b is positioned behind the inclined surface 36a. The contact surface 36b comes in contact with an inner surface of the outer housing 20 when the inner housing 30 is inserted into the outer housing 20 (see FIG. 7). Details of the contact surface 36b will be described later.

As illustrated in FIG. 3, a key groove 35 is formed on the upper surface of the first tubular part 30a. The key groove 35 is recessed rearward from a front end of the inner housing 30.

A locking piece 33 and two slits 34 are formed on each of a right surface (a surface facing the right side) and a left surface (a surface facing the left side) of the first tubular part 30a. The locking piece 33 and slits 34 on the left and right have shapes that are bilaterally symmetrical to each other in the radial direction. The two slits 34 formed on each of the right surface and the left surface of the first tubular part 30a are disposed with a distance therebetween in the first direction Z and extend in the longitudinal direction X. A portion disposed between the two slits 34 is the locking piece 33.

A locking protrusion 33a is formed at a central portion of the locking piece 33 in the longitudinal direction X. Each of the locking protrusions 33a protrudes outward in the second direction Y than the right surface or the left surface of the first tubular part 30a. The inner housing 30 is inserted into the outer housing 20 from a rear side of the outer housing 20. Then, the locking protrusions 33a are locked in the locking holes 21 of the outer housing 20, and thereby the inner housing 30 is connected to the outer housing 20. In order to facilitate connection of the inner housing 30 to the outer housing 20, an inclined surface 33b (second inclined surface) that inclines outward in the second direction Y toward the rear is formed on the locking protrusion 33a.

Figure 4:
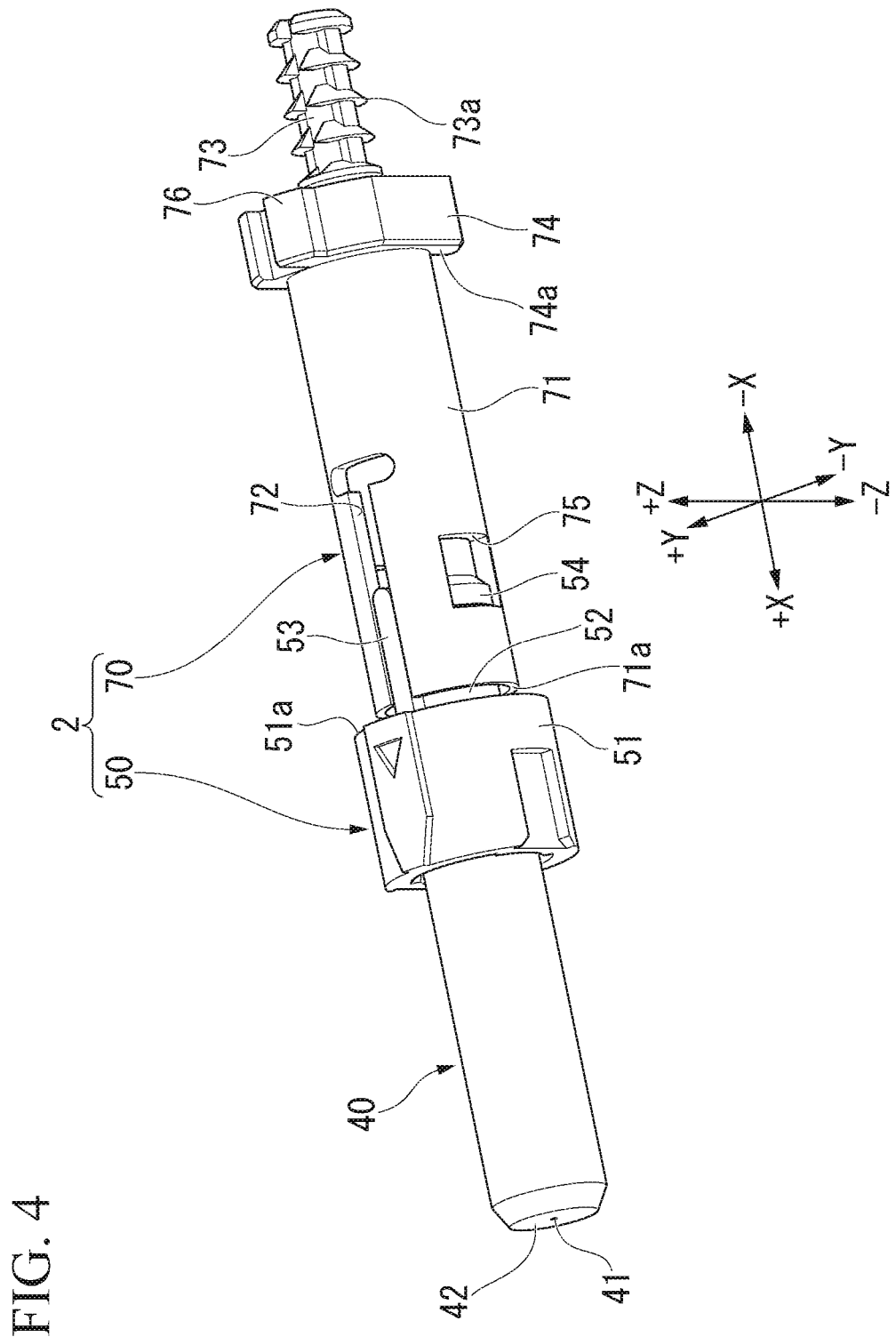
FIG. 4 is a view in which a ferrule, a first member, and a second member of FIG. 2 are extracted.

As illustrated in FIG. 4, the ferrule 40 has a cylindrical shape extending in the longitudinal direction X. As a material of the ferrule 40, for example, it is possible to employ zirconia. An optical fiber F is inserted into the fiber hole 41 of the ferrule 40 (see FIG. 5). The optical fiber F is fixed to the ferrule 40 by, for example, an adhesive. An end portion of the optical fiber F is exposed at the connection end surface 42.

As illustrated in FIG. 4, a rear end portion of the ferrule 40 is held by the holding part 2. The holding part 2 of one or more embodiments has a structure in which a first member 50 and a second member 70, which are separate bodies, are combined. However, the holding part 2 may be a single member (for example, a member in which the first member 50 and the second member 70 are integrated).

The first member 50 includes a flange portion 51 and a sliding tubular portion 52. The flange portion 51 has a tubular shape and surrounds a rear end portion of the ferrule 40. The ferrule 40 is fitted inside the flange portion 51. A rear end surface 51a of the flange portion 51 is biased forward by the biasing member 60 (see FIG. 2). Therefore, the ferrule 40 held by the flange portion 51 also receives a forward biasing force.

As illustrated in FIG. 4, the sliding tubular portion 52 extends rearward from the flange portion 51. An outer diameter of the sliding tubular portion 52 is smaller than an outer diameter of the flange portion 51. The sliding tubular portion 52 is positioned inside a surrounding tubular portion 71 of the second member 70. The sliding tubular portion 52 is slidable in the longitudinal direction X with respect to the surrounding tubular portion 71. A slide rib 53 protruding upward is formed on the sliding tubular portion 52. The slide rib 53 extends linearly in the longitudinal direction X. The slide rib 53 is positioned inside a slide groove 72 formed in the surrounding tubular portion 71 and slides with respect to the slide groove 72. A pair of retainers 54 are formed at a rear end portion of the sliding tubular portion 52. The retainers 54 protrude outward in the second direction Y from the sliding tubular portion 52.

The retainers 54 are positioned inside a pair of holes 75 formed in the surrounding tubular portion 71, respectively. Thereby, the first member 50 and the second member 70 are connected. As illustrated in FIG. 4, a dimension of the retainer 54 is smaller than a dimension of the hole 75 in the longitudinal direction X. In a state in which the retainer 54 is positioned at a front end portion of the hole 75, a gap in the longitudinal direction X is provided between a front end surface 71a of the surrounding tubular portion 71 and the rear end surface 51a of the flange portion 51. The first member 50 is able to slide rearward with respect to the second member 70 within a range of the gap.

The second member 70 includes a surrounding tubular portion 71, a sleeve fixing portion 73, and a second flange portion 74. The surrounding tubular portion 71 has a cylindrical shape extending in the longitudinal direction X. The second flange portion 74 is positioned at a rear end portion of the surrounding tubular portion 71 and protrudes outward in the radial direction. The second flange portion 74 has a spring receiving surface 74a facing forward. When the biasing member 60 is compressed between the rear end surface 51a of the flange portion 51 and the spring receiving surface 74a of the second flange portion 74, the biasing force described above is generated (see FIG. 2). As the biasing member 60, for example, it is possible to use a coil spring. A key portion 76 protruding upward is formed on the second flange portion 74. Although not illustrated, the key portion 76 is inserted into the key groove 35 of the inner housing 30 in a state in which the optical connector 1 has been assembled.

The sleeve fixing portion 73 has a cylindrical shape extending rearward from the second flange portion 74. An outer diameter of the sleeve fixing portion 73 is smaller than an outer diameter of the surrounding tubular portion 71. A plurality of protrusions 73a are formed on the sleeve fixing portion 73. The plurality of protrusions 73a protrude outward in the radial direction from the sleeve fixing portion 73 and are disposed at intervals in the longitudinal direction. A front end portion of the protection unit 80 is fixed to the sleeve fixing portion 73 (see FIG. 5).

When the optical connector 1 is connected to another optical connector, the connection end surface 42 of the ferrule 40 abuts against a ferrule of another optical connector 1. At this time, the ferrule 40 retreats, against the forward biasing force due to the biasing member 60. More specifically, the ferrule 40 and the first member 50 integrally retreat with respect to the second member 70 while compressing the biasing member 60 in the longitudinal direction X. At this time, the optical fiber F is able to be bent inside the surrounding tubular portion 71.

Figure 5:
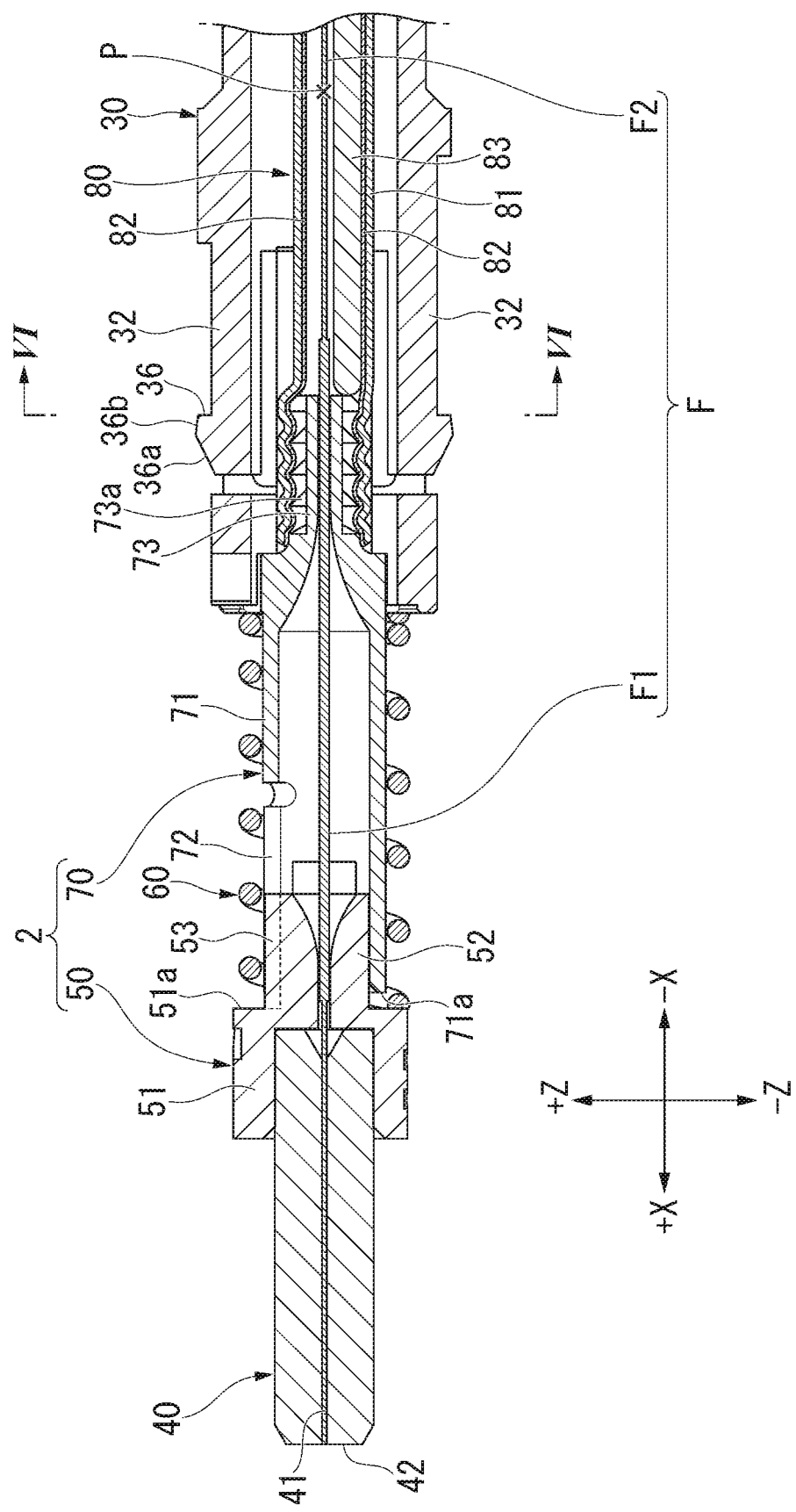
FIG. 5 is a cross-sectional view of the optical connector of one or more embodiments before a case and an outer housing are attached.
Figure 7:
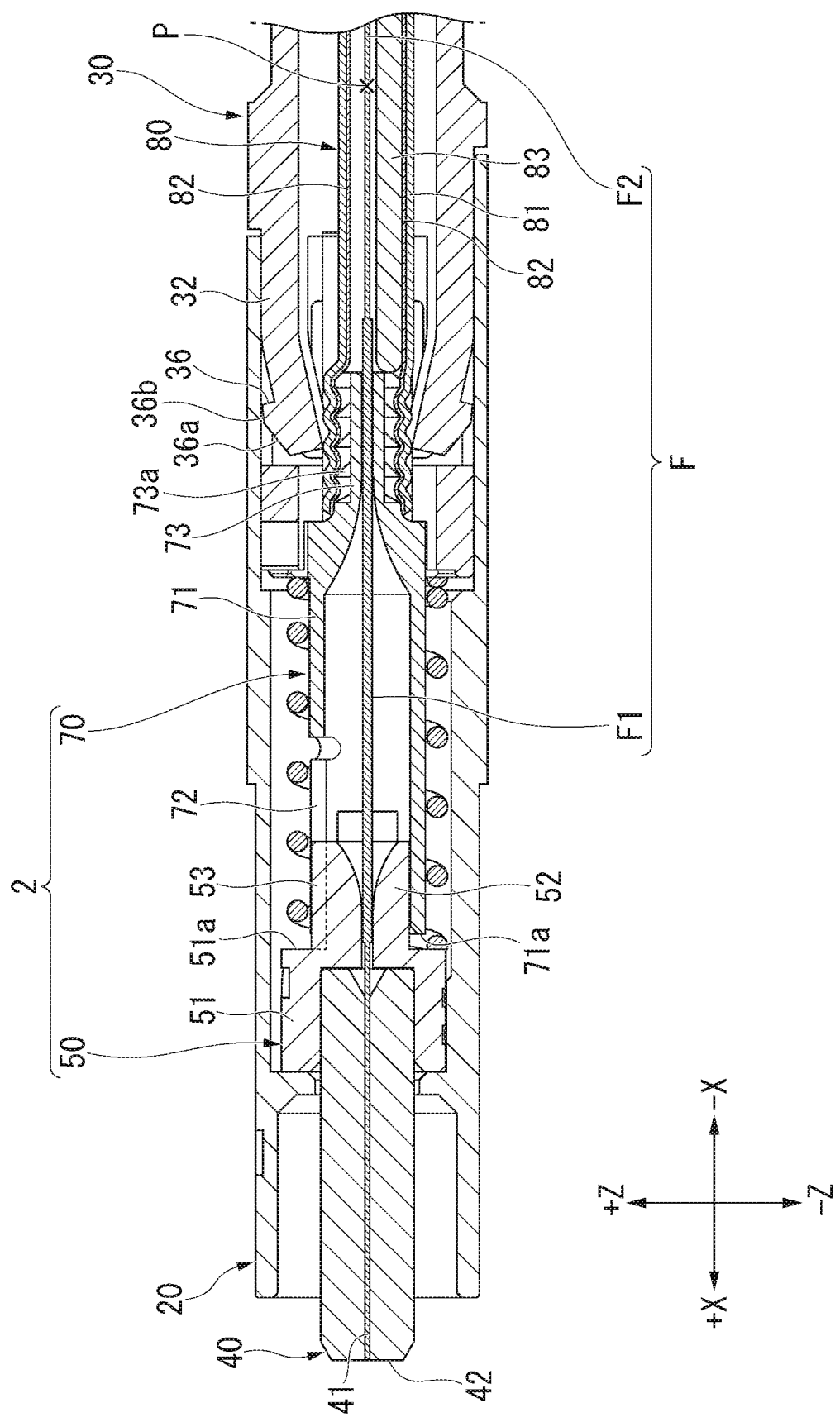
FIG. 7 is a cross-sectional view of a state in which the outer housing is attached to the inner housing of FIG. 5.

FIG. 5 is a cross-sectional view of the optical connector 1 of one or more embodiments before the case 10 and the outer housing 20 are attached. FIG. 6 is a cross-sectional view taken along line VI-VI indicated by the arrow in FIG. 5. FIG. 7 is a cross-sectional view of a state in which the outer housing 20 is attached to the inner housing 30 of FIG. 5. Note that, FIGS. 2 and 6 illustrate a state before a protection sleeve 81 is heat-shrunk. FIGS. 5 and 7 illustrate a state after the protection sleeve 81 is heat-shrunk.

As illustrated in FIGS. 5 and 6, the protection unit 80 includes the protection sleeve 81, a pair of tensile strength members 82, a rod-shaped tensile strength member 83, and an adhesive layer 84. The protection sleeve 81 has a tubular shape extending in the longitudinal direction X. As the protection sleeve 81, it is possible to use a heat-shrinkable tube.

The protection sleeve 81 before being fixed to the sleeve fixing portion 73 has an inner diameter larger than a maximum outer diameter of the plurality of protrusions 73a formed on the sleeve fixing portion 73. When the protection sleeve 81 is heated with the protection sleeve 81 covering the sleeve fixing portion 73 and the plurality of protrusions 73a, the protection sleeve 81 is heat-shrunk. Thereby, as illustrated in FIGS. 5 and 7, the protection sleeve 81 shrinks to fasten the protrusions 73a, and the protection sleeve 81 is fixed to the sleeve fixing portion 73.

The pair of tensile strength members 82 and the rod-shaped tensile strength member 83 are disposed inside of the protection sleeve 81. As illustrated in FIG. 5, the tensile strength members 82 have a sheet shape extending in the longitudinal direction X. As the tensile strength member 82, for example, it is possible to use a cloth obtained by weaving fibers or a sheet material obtained by hardening fibers with a resin. As the fibers, for example, it is possible to use aramid fibers, glass fibers, or the like. With the protection sleeve 81 fixed to the sleeve fixing portion 73, each of the tensile strength members 82 is sandwiched between the protrusions 73a and the protection sleeve 81. The pair of tensile strength members 82 are disposed on an upper side and a lower side of the sleeve fixing portion 73, respectively.

The rod-shaped tensile strength member 83 has a rod-shape (for example, a columnar shape) extending in the longitudinal direction X. It is possible to use any material as the rod-shaped tensile strength member 83. The rod-shaped tensile strength member 83 is positioned behind the sleeve fixing portion 73. The adhesive layer 84 is formed of a material that is softened by heating such as, for example, a hot-melt adhesive. In one or more embodiments, as illustrated in FIG. 6, the adhesive layer 84 in a state before assembly of the optical connector 1 has a tubular shape and is disposed on a radially inner side of the pair of tensile strength members 82 and the rod-shaped tensile strength member 83. When the protection sleeve 81 is heated, the adhesive layer 84 is softened, and at least a part thereof adheres to and integrates with an inner circumferential surface of the protection sleeve 81. In FIGS. 5 and 7, illustration of the adhesive layer 84 is omitted. The adhesive layer 84 may be applied, for example, on the inner circumferential surface of the protection sleeve 81 in advance.

As illustrated in FIG. 5, the optical fiber F has a structure in which two optical fibers (the built-in fiber F1 and the splicing fiber F2), which have been originally separated, are fusion-spliced at a fusion-splicing point P. That is, the optical connector 1 of one or more embodiments is a so-called fusion-splicing connector. The protection unit 80 has a role of covering and protecting the fusion-splicing point P. A built-in fiber F1 is an optical fiber fixed to the ferrule 40 in advance before the built-in fiber F1 and a connection fiber F2 are fusion-spliced. The connection fiber F2 is an optical fiber that has been built in the optical cable C (see FIG. 1).

Work of providing the optical connector 1 to an end portion of the optical cable C, that is, work of fusion-splicing the built-in fiber F1 and the connection fiber F2 may be performed at a site in which the optical cable C is laid. Therefore, work of heating the protection sleeve 81, that is performed after the fusion splicing, may also be performed at the site in which the optical cable C is laid.

Note that, a plurality of optical connectors 1 may be provided for one optical cable C.

Next, an assembling method (manufacturing method) of the optical connector 1 will be described.

First, the ferrule 40 is inserted and fixed inside the flange portion 51 of the first member 50. Thereafter, the built-in fiber F1 is inserted through the ferrule 40 via the first member 50 and is fixed by an adhesive with an end portion of the built-in fiber F1 on a tip side aligned with (exposed at) the connection end surface 42 of the ferrule 40. After the built-in fiber F1 is inserted through the inside of the biasing member 60 and the second member 70, the first member 50 and the second member 70 are connected. Specifically, the sliding tubular portion 52 is inserted inside the surrounding tubular portion 71 with the biasing member 60 set on an outer side of the surrounding tubular portion 71. At this time, the slide rib 53 is positioned in the slide groove 72, and the retainer 54 is positioned in the hole 75 (see FIG. 4).

When the built-in fiber F1, the ferrule 40, the first member 50, the biasing member 60, and the second member 70 are combined in this manner, a part of the built-in fiber F1 on the base end side becomes a state of extending rearward from the sleeve fixing portion 73 of the second member 70. Note that, in this state, the base end side of the built-in fiber F1 is coated with a resin for protection. Therefore, peeling off of the coating resin is generally performed before the fusion splicing.

Next, the base end side of the built-in fiber F1 from which the coating has been peeled off and the connection fiber F2 are fusion-spliced. At this time, the connection fiber F2 and the protection unit 80 are inserted through the inner housing 30 in advance.

Next, the protection sleeve 81 is fixed to the sleeve fixing portion 73. Specifically, the sleeve fixing portion 73 is covered with the protection sleeve 81, and the protection sleeve 81 is heated. With the heating, the protection sleeve 81 is heat-shrunk to fasten the protrusions 73a of the sleeve fixing portion 73. Also, the adhesive layer 84 disposed inside of the protection sleeve 81 softens and then hardens as it cools. Thereby, the protection sleeve 81 is adhesively fixed to the sleeve fixing portion 73. At this time, since the tensile strength member 82 is sandwiched between the sleeve fixing portion 73 and the protection sleeve 81, the tensile strength member 82 is also fixed to the sleeve fixing portion 73.

Next, the inner housing 30 is moved to the front side with respect to the holding part 2 (the second member 70). Thereby, the state illustrated in FIG. 5 is obtained. Although not illustrated in FIG. 5, when the key portion 76 of the holding part 2 enters the inside of the key groove 35 of the inner housing 30, rotation of the holding part 2 with respect to the inner housing 30 is restricted. Also, the protection unit 80 is fixed to the holding part 2. Therefore, it is suppressed that relative positions between the pair of tensile strength members 82 and the pair of tab portions 32 in the circumferential direction are deviated. In other words, it becomes a state in which the pair of tensile strength members 82 are positioned between the pair of tab portions 32.

Next, as illustrated in FIG. 7, the outer housing 20 is attached to the inner housing 30. More specifically, the ferrule 40, the holding part 2, and the inner housing 30 are inserted into the outer housing 20 from the rear side of the outer housing 20. At this time, since the inclined surface 36a and the inclined surface 33b are formed on the protruding portion 36 and the locking protrusion 33a of the inner housing 30, insertion work is facilitated. The outer housing 20 and the inner housing 30 are connected when the locking protrusion 33a of the inner housing 30 enters the inside of the locking hole 21 of the outer housing 20.

Here, when the inner housing 30 is inserted into the outer housing 20, the protruding portion 36 is pushed inward in the radial direction by an inner wall of the outer housing 20. This is because a distance between outer ends of a pair of protruding portions 36 in the radial direction before the inner housing 30 is inserted into the outer housing 20 is larger than a dimension of an inner space of the outer housing 20 in the first direction Z. When the protruding portion 36 is pushed, the tab portion 32 is tilted inward in the radial direction to press the protection sleeve 81.

When the tab portion 32 presses the protection sleeve 81, the protection sleeve 81 is sandwiched between the tab portions 32 and the protrusions 73a. With this configuration, it is possible to increase a fixing force of the protection sleeve 81 with respect to the sleeve fixing portion 73. It is possible to represent the fixing force of the protection sleeve 81 with respect to the sleeve fixing portion 73 by, for example, a magnitude of a force when the protection sleeve 81 is pulled backward and the protection sleeve 81 comes out of the sleeve fixing portion 73.

Also, each of the pair of tensile strength members 82 is positioned between the tab portions 32 and the sleeve fixing portion 73. Accordingly, the tensile strength members 82, together with the protection sleeve 81, are also sandwiched between the tab portions 32 and the protrusions 73a. It is possible to more firmly fix the protection sleeve 81 and the tensile strength members 82 to the sleeve fixing portion 73, compared to a case in which the protection sleeve 81 and the tensile strength members 82 are fixed to the sleeve fixing portion 73 only by a heat shrinkage force of the protection sleeve 81.

With the tab portion 32 tilted inside the outer housing 20, the contact surface 36b of the protruding portion 36 is in contact with the inner surface of the outer housing 20. Here, as illustrated in FIG. 7, the contact surface 36b is inclined with respect to the inner surface of the outer housing 20. Therefore, only a rear end portion of the contact surface 36b is in contact with the outer housing 20. According to the present configuration, compared to a case in which the entire contact surface 36b is brought into contact with the outer housing 20, it is possible to more stabilize a tilt amount of the tab portion 32 inward in the radial direction. As the tilt amount of the tab portion 32 is stabilized, a pressure applied on the protection sleeve 81 is also stabilized.

Thereafter, the assembly of the optical connector 1 is completed by attaching the case 10 to an outer side of the outer housing 20.

As described above, the optical connector 1 of one or more embodiments includes the ferrule 40 holding the optical fiber F, the holding part 2 holding the ferrule 40, the protection sleeve 81 whose tip is fixed to the sleeve fixing portion 73 of the holding part 2, the inner housing 30 inside which at least a part of the sleeve fixing portion 73 is housed, and the outer housing 20 inside which at least a part of the inner housing 30 is housed, in which the inner housing 30 includes a tab portion 32 which is able to be tilted in a radial direction, and the tab portion 32 is configured to apply a pressure on the protection sleeve 81 by being tilted inward in the radial direction in a state in which the tab portion 32 is positioned inside the outer housing 20. According to the optical connector 1 having such a configuration, by positioning the tab portion 32 inside the outer housing 20, it is possible to tilt the tab portion 32 inward in the radial direction to apply a pressure on the protection sleeve 81. Due to the pressure, it is possible to fix the protection sleeve 81 to the sleeve fixing portion 73. Therefore, it is possible to stabilize a fixed state, compared to a case in which the protection sleeve 81 is fixed only by a structure whose fixed state is affected by heating such as, for example, a heat shrinkage force of the protection sleeve 81 or adhesion by the adhesive layer 84.

Also, as illustrated in FIG. 7, the tab portion 32 is disposed at a position facing the sleeve fixing portion 73 in the first direction Z. According to this configuration, it is possible to clamp the protection sleeve 81 between the tab portion 32 and the sleeve fixing portion 73 by using the force of the tab portion 32 pressing the protection sleeve 81 inward in the radial direction. Therefore, it is possible to further increase the fixing force of the protection sleeve 81 with respect to the sleeve fixing portion 73.

Also, the sleeve fixing portion 73 includes the plurality of protrusions 73a disposed at intervals in the longitudinal direction X and protruding outward in the radial direction, and the tab portion 32 is disposed at a position facing at least a part of the plurality of protrusions 73a in the first direction Z. According to this configuration, it is possible to make the protrusion 73a bite into the protection sleeve 81 by the pressure of the tab portion 32 applied on the protection sleeve 81. Therefore, it is possible to further increase the fixing force of the protection sleeve 81 with respect to the sleeve fixing portion 73.

Also, as illustrated in FIG. 6, the inner circumferential surface 32a of the tab portion 32 has an arcuate shape when viewed from the longitudinal direction X. According to this configuration, it is possible to increase a contact area between the tab portion 32 and the protection sleeve 81 when the tab portion 32 is tilted inward in the radial direction. Therefore, it is possible to apply the pressure on the protection sleeve 81 more stably.

Also, the tab portion 32 has the contact surface 36b that comes into contact with the outer housing 20 in a state in which the pressure is applied on the protection sleeve 81. As illustrated in FIG. 7, the contact surface 36b is inclined with respect to the inner surface of the outer housing 20. According to this configuration, compared to a case in which the entire contact surface 36b comes in contact with the inner surface of the outer housing 20, a tilt amount of the tab portion 32 directed inward in the radial direction is stabilized. Therefore, it is possible to stabilize the pressure of the tab portion 32 applied on the protection sleeve 81.

Also, the tensile strength member 82 is disposed inside of the protection sleeve 81, and the tensile strength member 82 is positioned between the tab portion 32 and the sleeve fixing portion 73. According to this configuration, it is possible to fix the tensile strength member 82 to the sleeve fixing portion 73 by using the pressure of the tab portion 32 applied on the protection sleeve 81.

The technical scope of the present invention is not limited to the above-described embodiments, and it is possible to make various modifications in a range not departing from the meaning of the present invention.

For example, in the above-described embodiments, the inner housing 30 includes two tab portions 32. However, it is possible to change the number of the tab portions 32 of the inner housing 30. The number of the tab portions 32 may be one, or may be three or more.

Also, it is possible to change the number of the tensile strength members 82 disposed inside of the protection sleeve 81. The number of the tensile strength members 82 may be one, or three or more.

Also, in the above-described embodiments, the tab portion 32 and the sleeve fixing portion 73 are disposed to face each other in the radial direction. However, the tab portion 32 may not necessarily have to face the sleeve fixing portion 73. For example, even when the tab portion 32 is positioned behind the sleeve fixing portion 73, it is possible to make the protection sleeve 81 bite into the protrusions 73a of the sleeve fixing portion 73 by the tab portion 32 applying a pressure on the protection sleeve 81 inward in the radial direction. Similarly, the tab portion 32 may not be disposed at a position facing the protrusions 73a.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Optical connector
2 Holding part
20 Outer housing
30 Inner housing
32 Tab portion
32a Inner circumferential surface
36b Contact surface
40 Ferrule
73 Sleeve fixing portion
73a Protrusion
81 Protection sleeve
82 Tensile strength member
F Optical fiber
X Longitudinal direction

The invention claimed is:

1. An optical connector comprising:
a ferrule holding an optical fiber;
a holder holding the ferrule;
a protection sleeve comprising a tip that is fixed to a sleeve fixing portion of the holder;
an inner housing in which at least a part of the sleeve fixing portion is housed; and
an outer housing in which at least a part of the inner housing is housed, wherein
the inner housing comprises a tab portion that:
tilts in a radial direction of the ferrule, and
applies a pressure on the protection sleeve by tilting inward in the radial direction in a state in which the tab portion is disposed inside the outer housing.

2. The optical connector according to claim 1, wherein the tab portion is disposed at a position facing the sleeve fixing portion.

3. The optical connector according to claim 2, wherein the sleeve fixing portion comprises protrusions:
disposed at intervals in a longitudinal direction of the ferrule, and
protruding outward in the radial direction, and
the tab portion is disposed at a position facing at least a part of the protrusions.

4. The optical connector according to claim 1, wherein an inner circumferential surface of the tab portion has an arcuate shape when viewed from a longitudinal direction of the ferrule.

5. The optical connector according to claim 1, wherein
the tab portion has a contact surface that comes in contact with the outer housing in a state in which a pressure is applied on the protection sleeve, and
the contact surface is inclined with respect to an inner surface of the outer housing.

6. The optical connector according to claim 1, wherein a tensile strength member is disposed inside of the protection sleeve and between the tab portion and the sleeve fixing portion.

* * * * *